United States Patent [19]

Sugiyama et al.

[11] Patent Number: 4,500,983

[45] Date of Patent: Feb. 19, 1985

[54] ROTARY RECORDING MEDIUM REPRODUCING APPARATUS

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Japan

[21] Appl. No.: 401,321

[22] Filed: Jul. 23, 1982

[30] Foreign Application Priority Data

Jul. 28, 1981 [JP] Japan .......................... 56-111838[U]

[51] Int. Cl.$^3$ ........................ G11B 19/10; G11B 17/04
[52] U.S. Cl. ..................................... 369/77.2; 360/97; 369/258; 369/262
[58] Field of Search .......................... 360/97, 99, 105; 369/77.2, 219, 220, 221, 262, 264, 258

[56] References Cited

U.S. PATENT DOCUMENTS

| | | | |
|---|---|---|---|
| 4,196,906 | 4/1980 | Torrington | 369/77.2 |
| 4,326,284 | 4/1982 | Elliott | 369/77.2 |
| 4,357,698 | 11/1982 | Torrington | 369/77.2 |
| 4,380,781 | 4/1983 | Hirata | 369/77.2 |
| 4,395,744 | 7/1983 | Saito et al. | 360/133 |

FOREIGN PATENT DOCUMENTS 2489028  2/1982  France .............. 369/77.2

*Primary Examiner*—Steven L. Stephan

*Attorney, Agent, or Firm*—Andrus, Sceales, Starke & Sawall

[57] ABSTRACT

A rotary recording medium reproducing apparatus has an inserting opening through which the case of the medium is inserted, a turntable for rotating the medium, a locking mechanism for the lid of the case, and a medium clamping mechanism. A jacket opening enlarging mechanism is provided in the vicinity of the inserting opening for moving over the turntable between the vicinity of the inserting opening and the innermost part of the reproducing apparatus, in response to an operation in which the case is inserted into and then pulled out from the recording apparatus. A medium supporting member provided at a center part of the turntable moves upwards and downwards independently of the turntable, for raising to support an inner peripheral part of the medium above the turntable. A supporting member elevator mechanism elevates the medium supporting member so that the latter is in a raised state when the case or an empty jacket is inserted into the reproducing apparatus. A driving circuit operates the supporting member elevator mechanism in one direction to operate the mechanism so that the medium supporting member is raised and operates in a reverse direction to lower the supporting member. A control circuit and detector operates the driving circuit if the supporting member is still at the raised position after a predetermined time period.

5 Claims, 7 Drawing Figures

ROTARY RECORDING MEDIUM REPRODUCING APPARATUS

BACKGROUND OF THE INVENTION

The present invention relates to rotary recording medium reproducing apparatuses capable of placing and leaving a rotary recording medium in a state possible for reproduction within the rotary recording medium reproducing apparatus when a jacket (disc case) having a lid for accommodating the rotary recording medium therein is inserted into and then pulled out from within the rotary recording medium reproducing apparatus, and also capable of incasing the rotary recording medium within the jacket so that the rotary recording medium can be obtained outside the rotary recording medium reproducing apparatus together with the jacket, when the empty jacket is inserted into and then pulled out from within the reproducing apparatus. The present invention further and especially relates to the above type of a rotary recording medium reproducing apparatus provided with a disc lifter lowering control device for automatically lowering a disc lifter which supports an inner peripheral part of the rotary recording medium and supports the rotary recording medium above a turntable, when a predetermined time period elapses without an anticipated operation being performed after the disc lifter is raised.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon holding and placing of the disc within the reproducing apparatus, by inserting into and then pulling out a disc case which has a lid and accommodates a disc therein, from within the reproducing apparatus.

As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means for holding at least one of the disc and the lid member provided at an innermost part on the opposite side from the inserting opening with respect to the turntable, lowering and raising means for lowering the disc to a position where the disc is placed onto the turntable from a holding position where the disc is held by the holding means upon starting of the reproduction and raising the disc to the holding position from the turntable upon finishing or discontinuing of the reproduction, a reproducing transducer for reproducing the disc placed onto the turntable, and moving means for moving the reproducing transducer from a waiting position to a reproducing position with respect to the disc.

In the above previously proposed reproducing apparatus, the disc is raised and lowered by a disc lifter. When the disc is lowered, the outer peripheral part and the inner peripheral part of the disc are supported, and the disc is stably placed onto the turntable. However, when the disc is raised, only the inner peripheral part of the disc is supported by the disc lifter. Accordingly, the state in which the disc is supported is unstable, since the outer peripheral part of the disc is not supported. If the disc is left in the above state for a long period of time, the disc may become deformed. Therefore, it is desirable to construct the reproducing apparatus so that the state in which the disc lifter is lowered is the basic state, and the disc lifter is raised every time the disc case or the jacket is inserted into the reproducing apparatus, by performing a predetermined operation to drive an elevator motor for raising the disc lifter.

Accordingly, a reproducing apparatus provided with a disc lifter mechanism which is in a basic position when the disc lifter is in the lowered state, in a U.S. patent application Ser. No. 288,292, now U.S. Pat. No. 4,395,744 filed July 30, 1981, entitled "DISC-SHAPED RECORDING MEDIUM REPRODUCING APPARATUS" in which the assignee is the same as that of the present application.

However, even in this latter proposed reproducing apparatus, if the operator forgets to start a play operation after the disc is loaded into the reproducing apparatus by inserting and then extracting the disc case into and from the reproducing apparatus, or when the operator forgets to recover the disc from the reproducing apparatus after an operation is performed to terminate the disc reproducing operation, for example, the disc will be left in a state supported above the turntable for an exceedingly long period of time where only the inner peripheral part of the disc is supported. Especially when the reproducing apparatus is used under a high temperature condition, the unsupported or free outer peripheral part of the disc may become deformed in a hanging manner while the disc is left in the above partially supported unstable state. Therefore, there still was a disadvantage in that such deformation of the disc introduced interference upon reproduction, and lead to difficulties when the disc is recovered within the jacket.

SUMMARY OF THE INVENTION

Accordingly, it is a general object of the present invention to provide a novel and useful rotary recording medium reproducing apparatus in which the above described disadvantages have been overcome.

Another and more specific object of the present invention is to provide a rotary recording medium reproducing apparatus constructed so that a disc lifter is automatically lowered to return a disc lifter mechanism in a basic position when a predetermined time period elapses without an anticipated operation being performed after the disc lifter is raised. According to the apparatus of the present invention, a rotary recording medium supported by the disc lifter is always placed onto a turntable after a predetermined time period has elapsed, so that inner and outer peripheral parts of the disc are supported. Hence, the rotary recording medium will not be left neglected in a state where only the inner peripheral part of the rotary recording medium is supported for an exceedingly long period of time. Therefore, the rotary recording medium is positively prevented from being deformed in the above described manner.

Other objects and further features of the present invention will be apparent from the following detailed description when read in conjunction with the accompanying drawings.

DETAILED DESCRIPTION

Figure 1:
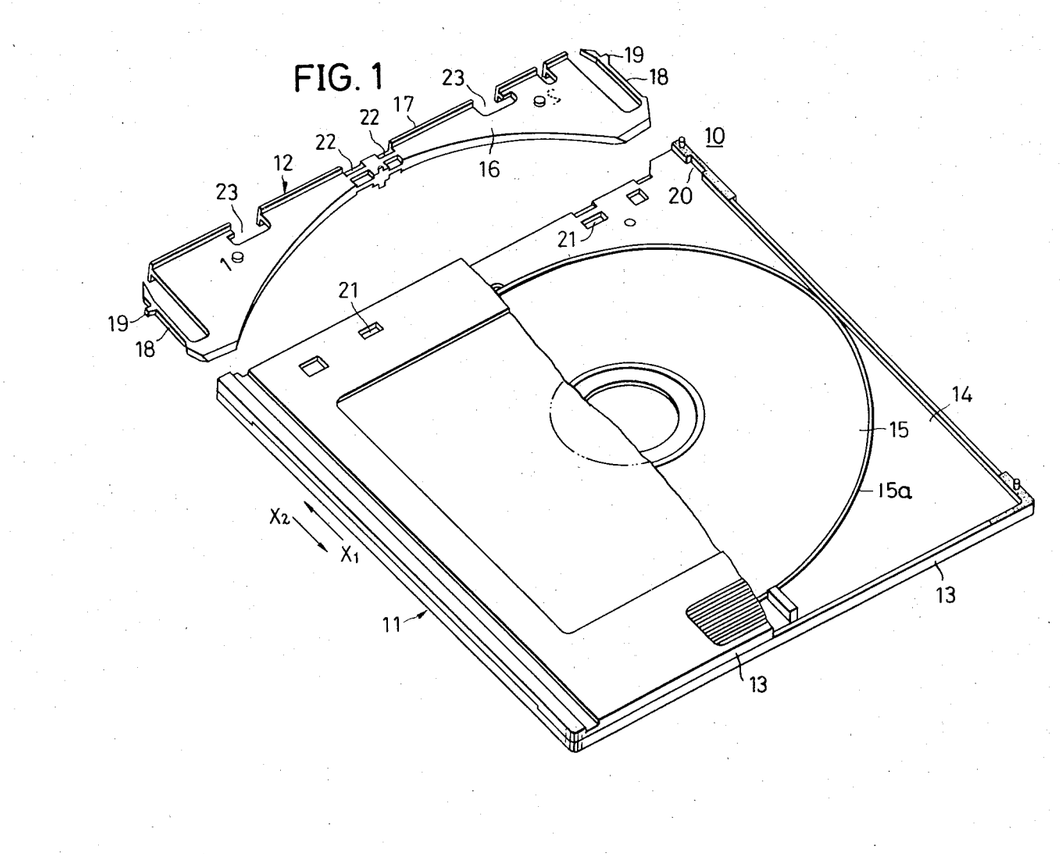
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention. A disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
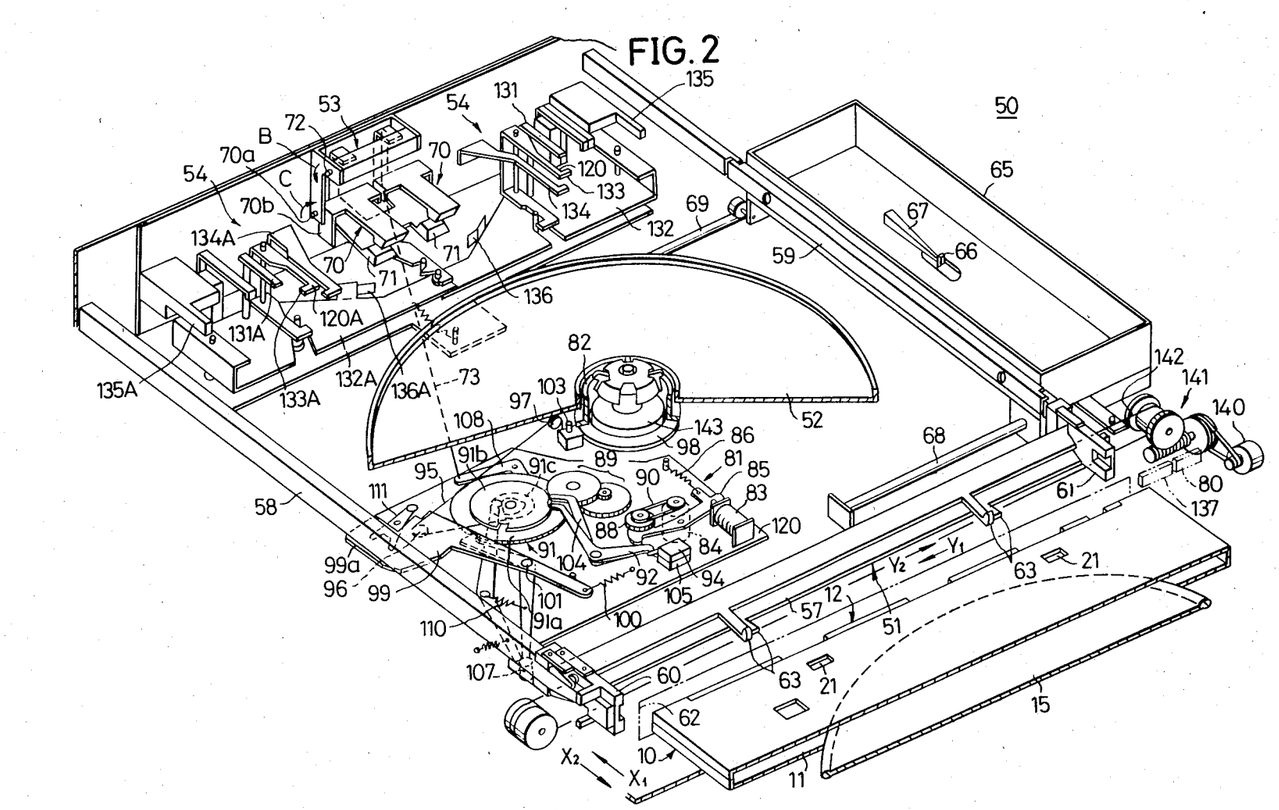
FIG. 2 is a perspective view showing the inner construction of a disc reproducing apparatus according to the present ivnention, with a part cut away.

A reproducing apparatus 50 shown in FIG. 2 is designed so that in its basic state, a disc lifter is lowered to a final position. Every time the disc case is to be inserted into the reproducing apparatus, a load-eject button is pushed to operate an elevator motor so as to move the disc lifter upwards.

The reproducing apparatus 50 substantially comprises a jacket opening enlarging mechanism 51, a turntable 52 to rotate the disc 15 positioned thereon, a disc holding mechanism 53 for clamping the disc 15, a lid plate locking mechanism 54 for locking the lid plate 12, and the like.

The jacket opening enlarging mechanism 51 comprises upper and lower beams 56 and 57 extending in the directions of arrows Y1 and Y2, and sliders 60 and 61 which are respectively fixedly inserted into guide rails 58 and 59, to support both ends of the respective beams 56 and 57 and to move along the guide rails 58 and 59. The jacket opening enlarging mechanism 51 is guided by guide rails 58 and 59, and moves between the innermost part of the reproducing apparatus 50 and a disc case inserting opening 62 provided at the frame of the reproducing apparatus 50, in the direction of arrows X1 and X2.

Enlarging fingers 63 are respectively formed on each of the beams 56 and 57, directed towards the inserting opening 62. When each of the beams 56 and 57 are positioned on the side of the inserting opening 62, the enlarging fingers 63 mutually close upon each other, and when the beams 56 and 57 move in the direction of the arrow X1, the enlarging fingers 63 angularly rotate in upward and downward directions so as to mutually separate from each other.

A pickup frame 65 is provided with a reproducing stylus 66 and a cantilever 67, and moves in the directions of the arrows Y1 and Y2 along a pair of guide rods 68 and 69.

The disc holding mechanism 53 and the lid plate locking mechanism 54 are constructed symmetrically on the left and right sides with respect to a line which passes through the center of the turntable in the direction of the arrow X1. The parts on the left side are designated by the same reference numerals as the corresponding parts on the right side, with a subscript "A", and their description will be omitted.

The disc holding mechanism 53 is provided at the inner part of the reproducing apparatus 50 on the opposite side of the inserting opening 62, and comprises a pair of upper and lower holding fingers 70 and 71. The lower holding finger 71 is axially supported on an upper pin 72. A wire 73 is linked to the holding finger 71, and the holding finger 71 receives a rotational force in the direction of an arrow B due to the force of a spring 74. Accordingly, the holding finger 71 receives a force urging rotation in the upward direction. The upper holding finger 70 is axially supported by a pin 70a.

Upon reproduction of the disc 15, the disc case 10 is inserted through the inserting opening 62 of the reproducing apparatus 50, by inserting the disc case 10 with the side of the lid plate 12 into the direction of the arrow X1.

Figure 3:
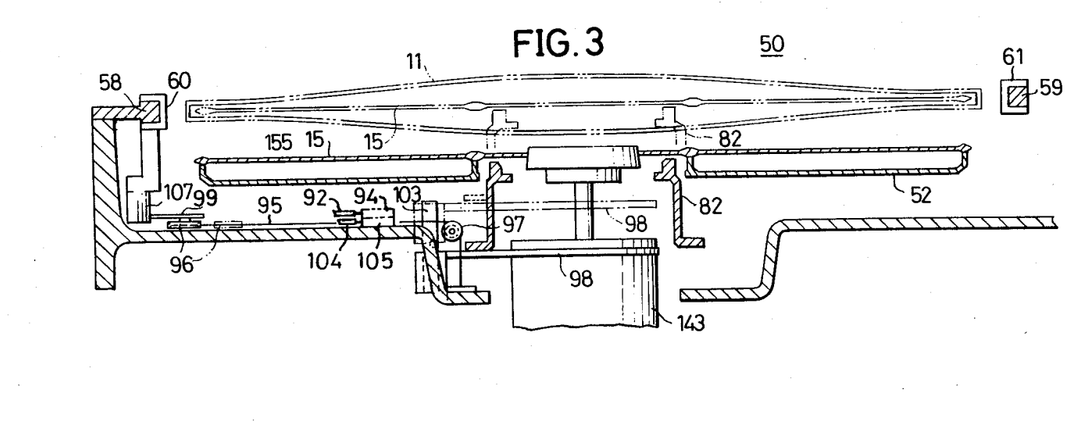
FIG. 3 is a schematic elevation, in vertical section, of the apparatus shown in FIG. 2.

Upon insertion of the disc case 10, a load-eject button 80 is pushed. Responsive to this operation, a disc lifter elevator mechanism 81 changes from a state indicated in FIGS. 2 and 4 to a final state indicated in FIG. 5. At first, a disc lifter 82 (disc supporting member) is at a lowered position, that is, at a position capable of reproducing the disc, as shown in FIGS. 2 and 3. When the button 80 is pushed, a plunger 83 is energized, and a D.C. elevator motor 84 starts to rotate in a forward direction. Description on a driving circuit for this motor 84 will be given hereinafter. When the plunger 83 is energized, a rotatable lever 85 rotates clockwise about a pin 87 against a force exerted by a spring 86, and hence, a gear 88 supported on the lever 85 meshes with reduction gears 89. This gear 88 is rotated clockwise by the elevator motor 84 by way of a belt 90. The rotation of the gear 88 is transmitted by way of the reduction gears 89 to a gear part 91a of a cam-gear structure 91 which rotates counterclockwise at a reduced speed.

Figure 4:
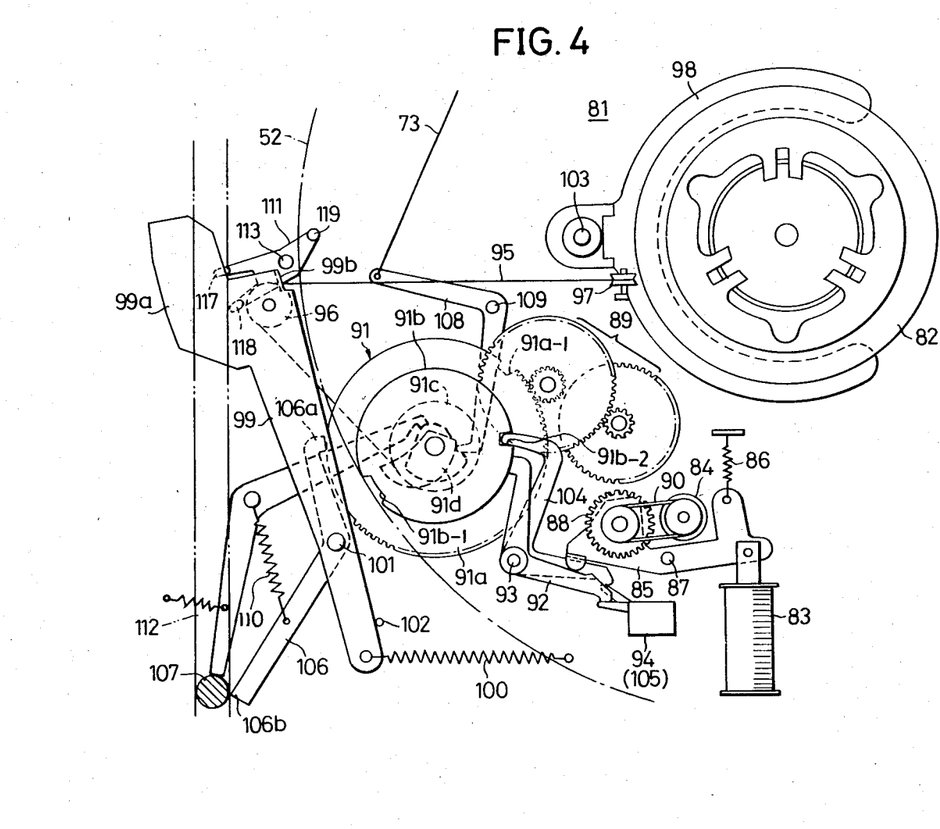
FIGS. 4 and 5 are plan views respectively showing one embodiment of a disc lifter elevator mechanism shown in FIG. 2, in a state before insertion of the disc case, and in a state where the disc lifter has elevated so as to allow insertion of the disc case.
Figure 5:
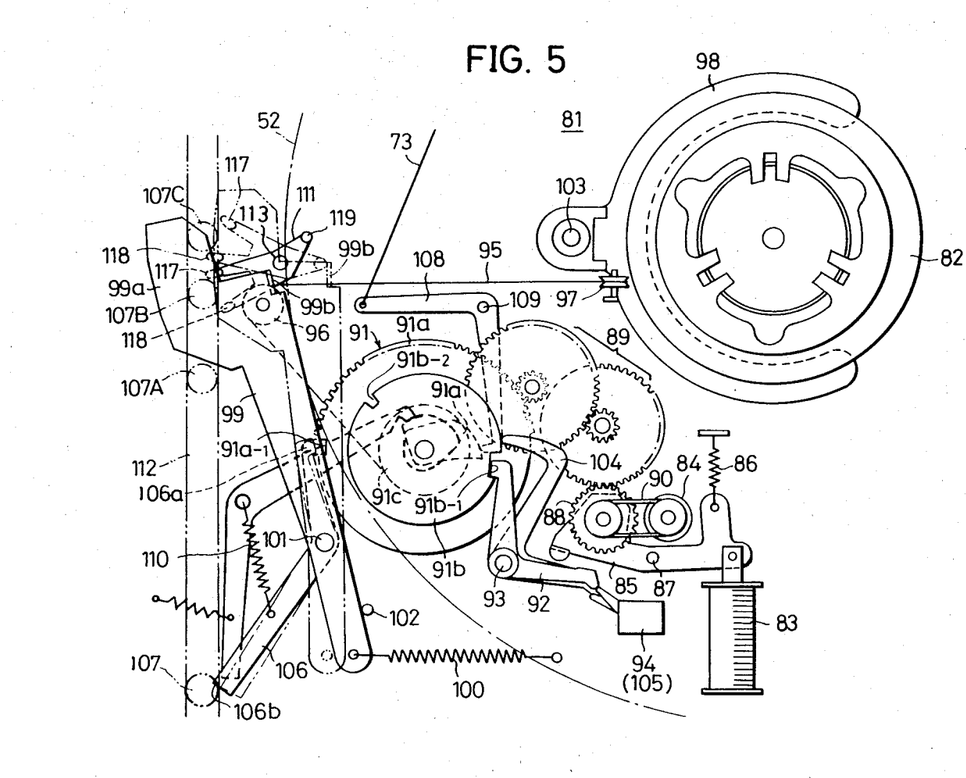

When the cam-gear structure 91 rotates by an angle of approximately 140 degrees, a beak at the end of a first switch arm 92 enters into a first depression 91b-1 of a disc cam 91b, and this arm 92 rotates counterclockwise about a pin 93 to turn OFF a first microswitch 94. When this microswitch 94 is turned OFF, the elevator motor 84 is cut off from the power source and stops rotating. This motor 84 thus stopped, then serves as a load against the reverse rotation of the cam-gear structure 91 which is maintained stopped at the rotated position.

As the cam-gear structure 91 rotates, a wire 95 is taken up by a reel 91c. The tensioned wire 95 is guided by pulleys 96 and 97, and is linked to a U-shaped elevator plate 98 resting at a lowered position thereof. The pulley 96 provided on a lifter elevating lever 99, is urged to rotate counterclockwise about a pin 101 by a spring 100, and is engaged with a stopper pin 102. This lifter elevating lever 99 is provided in a manner not related to the cam-gear structure 91, and rotates independently from the cam-gear structure 91. As the wire 95 is taken up by the reel 91c, the elevator plate 98 is pulled upwards and moves upwards along a guide post 103. Hence, the disc lifter 82 is pushed upwards to a position capable of supporting the disc 15 as indicated by a two-dot chain line in FIG. 3.

A beak of a second switch arm 104 slips out from a second depression 91b-2 of the disc cam 91b. The arm 104 rotates clockwise to cause a second microswitch 105 positioned below the first microswitch 94 to be turned ON. Here, the first and second microswitches 94 and 105 operate together to constitute a disc lifter position detector which will be described hereinafter. When the first microswitch 94 is OFF and the second microswitch 105 is ON, a microcomputer recognizes that the disc lifter 82 is at the raised disc supportable position. In a state before the load-eject button 80 is manipulated, the disc lifter position detector recognizes the disc lifter 82 is at the lowered position where it is possible to start reproduction, because the first microswitch 95 is ON and the second microswitch 105 is OFF.

The cam-gear structure 91 is then at the rotational position where a depression 91a-1 of the gear 91a confronts a beak 106a of a lifter lock lever 106. At this point, an end 106b of the lifter lock lever 106 is engaged to a cylindrical pin member 107 projecting downward from the slider 60 which is positioned at the front of the reproducing apparatus 50, so that the beak 106a does not enter into the depression 91a-1. Furthermore, a cam 91d angularly rotates an L-shaped clamp control arm 108 counterclockwise about a pin 109. Hence, the wire 73 is pulled to cause the holding fingers 70 and 71 to assume the state capable holding the disc.

When the reproducing apparatus 50 assumes the above described state, the disc case 10 is inserted into the reproducing apparatus 50. By this insertion of the disc case 10, the jacket opening enlarging mechanism 51 is pushed and moved in the direction of the arrow X1 by the disc case 10. When the enlarging mechanism 51 moves, the upper and lower beams 56 and 57 respectively rotate angularly, and the enlarging fingers 63 thus respectively move in directions so as to mutually separate from each other. Accordingly, the tip ends of the enlarging fingers 63 engage with engaging windows 21 of the jacket 11, and enlarge the front part of the upper and lower jacket halves 13 upwards and downwards, to enlarge the opening of the jacket 11.

Additionally, as the disc case 10 is inserted, the pin member 107 moves from a position indicated in FIG. 2 towards the direction of the arrow X1. When the pin member 107 moves from the original position, the lifter lock lever 106 is released from the engagement with the pin member 107. Thus, the lifter lock lever 106 rotates clockwise due to a spring 110, and the beak 106a enters into the depression 91a-1 to lock the cam-gear structure 91 at this rotational position. The end part 106b of the lifter lock lever 106 enters within a path 112 of the pin member 107.

This pin member 107 moves along the moving path 112 as indicated by positions 107A→107B→107C in FIG. 5. When the pin member 107 moves, the pin member 107 makes contact with and pushes aside a cam part 99a of the lifter elevating lever 99, to angularly rotate the cam part 99a clockwise against a force exerted by the spring 100, up to a position indicated by a two-dot chain line in FIG. 5. The lever 99 is then locked by a lock lever 111.

Accompanied by the angular rotation of the lever 99, the pulley 96 shifts to a position indicated by two-dot chain line in FIGS. 3 and 5. The pulley 96 guides the wire 95 stretched across between the elevator plate 98 and the cam-gear structure 91 at an intermediate position. Thus, slack is introduced in the wire 95, and both the disc lifter 82 and the elevator plate 98 accordingly move downwards due to their own weights, to retreat from the disc insertion passage.

Before the disc case 10 is inserted, the lock lever 111 assumes the position angularly rotated counterclockwise, and a pin 117 is within the path 112. As the disc case 10 is inserted, this pin 117 is pushed or kicked by the pin member 107 moving in the direction of the arrow X1, to forcibly rotate the lock lever 111 to assume the position angularly rotated clockwise. By this angular rotation of the clock lever 111, the lifter elevator lever 99 is engaged at a bent lug 99b thereof by a lock pin 119, and is accordingly locked at the position angularly rotated clockwise. The pin 117 retreats from the path 112 and a pin 118 enters within the path 112.

Referring back to FIG. 2, when the disc case 10 is inserted into the innermost part of the reproducing apparatus 50 together with the enlarging mechanism 51, through the upper side of the turntable 52, ride-over parts 22 of the lid plate 12 enter between the holding parts which are provided at positions mutually opposite to the holding fingers 70 and 71, and pass through these holding parts by pushing and spreading these parts. The holding fingers 70 and 71 close, as will be described hereinafter, after the ride-over parts 22 of the lid plate 12 have passed through, and the holding parts accordingly clamp a groove guard 15a of the disc 15.

Accompanied by the insertion of the disc case 10, locking fingers 130 and 130A relatively enter inside L-shaped cutouts 23 of the lid plate 12, and the rim portion 17 accordingly pushes contact fingers 131 and 131A. When the contact fingers 131 and 131A are pushed by the lid plate 12, main levers 132 and 132A respectively rotate to be latched. Furthermore, the locking fingers 130 and 130A rotate angularly in directions so as to mutually separate from each other, and L-shaped parts 133 and 133A provided at the tip ends of the above locking fingers 130 and 130A respectively enter into the innermost parts of the cutouts 23, to lock the lid plate 12. The lid plate 12 is limited of its movement in the direction of the arrow X1 by the contact fingers 131 and 131A, and the lid plate 12 is thus locked and supported at the innermost part of the reproducing apparatus 50 in a state where the lid plate 12 is placed and supported on supporting fingers 134 and 134A.

Furthermore, engagement releasing members 135 and 35A enter inside the openings on the right and left sides of the disc case 10, and push sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11.

When the main levers 132 and 132A rotate to positions where they are latched, leaf springs 136 and 136A respectively provided at the bent parts of the main levers push against a vertically extending part 70b of the upper holding finger 70. Hence, a rotational force in the direction of an arrow C is applied to the holding finger 70. Thus, the disc 15 is held at a predetermined height by the lower holding finger 71 and the upper holding finger 70.

Accordingly, when the disc case 10 is inserted into the final position, the engagement of the lid plate 12 with respect to the jacket 11 is released. The disc case 10 thus becomes locked by the locking fingers 120 and 120A, and the disc 15 is held by the holding fingers 70 and 71.

Next, the jacket 11 is pulled out in the direction of the arrow X2. Since the lid plate 12 and the disc 15 are respectively locked and held as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. When the jacket 11 moves in the direction of the arrow X2, the jacket opening enlarging mechanism 51 also moves together with the jacket 11, in the direction of the arrow X2.

When the jacket 11 is pulled out halfway, the pin member 107 moving in the direction of the arrow X2 pushes the pin 118 aside to angularly rotate the lock lever 111 counterclockwise. The lifter elevating lever 99 is accordingly released from locked state, and angularly rotates counterclockwise due to the force exerted by the spring 100. Accompanied by the angular rotation of the lever 99, the wire 95 is pulled, and the disc lifter 82 again moves up to the disc supportable position, to support the center part of the disc 15. In this state, the disc 15 is supported horizontally at a position above the turntable 52, by the holding fingers 70 and 71 and the disc lifter 82. When the jacket 11 is further pulled out, the disc 15 completely separates from the jacket 11, the jacket opening enlarging mechanism 15 returns to its original position, and the jacket opening enlarging fingers 63 respectively rotate angularly in directions so as to mutually close upon each other and separate from engaging windows 21. The jacket 11 thus returns to its original state due to its flexibility, and the enlarged opening also returns to the original state. Therefore, the jacket 11 is completely pulled out from the reproducing apparatus 50.

Whereupon the slider 60 returns into the original position, the pin member 107 pushes aside the end part 106b of the lifter lock lever 106, which thereby rotates to assume the original state indicated in FIG. 4, where the beak 106a slips out from the depression 91a-1. The cam-gear structure 91 is accordingly released from the locked state by the lever 106.

Then, a play button 137 is pushed. Responsive to this operation, the elevator motor 84 begins to rotate in a reverse direction, and the cam-gear structure 91 rotates clockwise from the position indicated in FIG. 5 up to the original position indicated in FIG. 4. The cam-gear structure 91 is locked by a beak part at the tip of the rotatable arm 104 entered into the depression 91b-2. The rotatable arms 92 and 104 then assume the state indicated in FIG. 4, and the microswitches 94 and 105 are switched over. Hence, the motor 84 stops and the plunger 83 is de-energized. As a result of the angular rotation of the cam-gear structure 91, the control arm 108 rotates clockwise to slacken the wire 73. Accordingly, the holding finger 71 rotates in a direction opposite to the direction of an arrow B, to release the clamping with respect to the disc 15. As another result of the rotation of the cam-gear structure 91, the wire 95 is pulled out from the reel 91c, and the disc lifter 82 moves downwards. Accordingly, the disc 15 moves down and is placed onto the turntable 52.

Furthermore, a motor 140 starts to rotate a wire belt 142 to travel by way of worm gear 141. Accordingly, the pickup frame 65 moves in the direction of the arrow X1 from the waiting position. In addition, the turntable 52 is rotated by a motor 143. Thus, the disc 15 is relatively scanned by the reproducing stylus 66 which reproduces the information signal.

Next, description will be given with respect to an operation in which the disc 15 is recovered from within the reproducing apparatus 50.

When the load-eject button 80 is pushed during the reproducing mode, the motor 143 stops to stop the rotation of the disc 15. Moreover, the motor 140 rotates in a reverse direction to return the pickup frame 65 into the waiting position. The plunger 83 is energized and the elevator motor 84 starts to rotate. Hence, the disc lifter elevator mechanism 81 and the disc holding mechanism 53 operate, similarly as in the above described disc loading mode. That is, the disc 15 is clamped at the groove guard 15a by the disc holding mechanism 53, and is supported on the disc lifter 82 at the position above the turntable 52.

A lead-out signal recorded at the innermost peripheral part of the disc 15 is reproduced, when reproduction is performed up to the innermost peripheral part of the disc 15. Upon reproduction of the lead-out signal, the reproducing apparatus 50 operates in the same manner as in the case where the load-eject button 80 is manipulated during the above described reproducing mode.

Upon recovering of the disc 15, the empty jacket 11 is inserted with its front end first into the reproducing apparatus 50 through the inserting opening 62. The jacket opening enlarging mechanism 51 is pushed by the jacket 11 and moves again in the direction of the arrow X1, to enlarge the opening of the jacket 11. Accompanied by the insertion of the jacket 11 in the direction of the arrow X1, the disc 15 is relatively inserted inside the jacket 11 through the opening of the jacket 11.

When the jacket 11 is inserted into the innermost position inside the reproducing apparatus 50, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening.

Therefore, when the jacket 11 is pulled out in the direction of the arrow X2, the lid plate 12 then moves in the direction of the arrow X2 together with the jacket 11. The disc 15 is pushed by the lid plate 12, and is forcibly pushed out in the direction of the arrow X2 by the holding part. Accordingly, the disc 15 separates from the reproducing apparatus 50 to be recovered within the disc case 10.

Accompanied by the moving of the enlarging mechanism 51, the lifter elevating lever 99, the lifter lock lever 106, and the lock lever 111 operate, similarly as in the above described disc loading operation.

Figure 6:
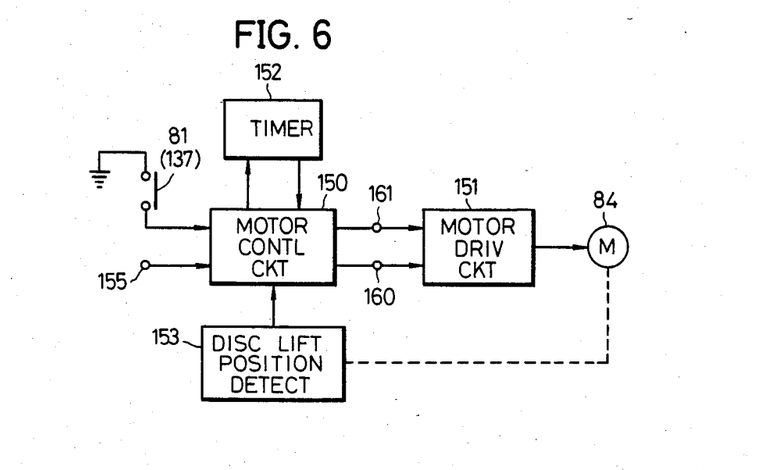
FIG. 6 is a systematic block diagram showing a circuit for controlling the operation of a D.C. elevator motor which operates the disc lifter elevator mechanism.

FIG. 6 shows a control system for controlling the operation of the above disc elevator mechanism (elevator motor 84).

In FIG. 6, the elevator motor 84 is controlled by a motor control circuit 150 and is driven by a motor driving circuit 151. The motor driving circuit 151 is shown in more detail in FIG. 7, and description thereof will be given afterwards. A timer 152 and a disc lifter position detector 153 are provided in relation to the motor control circuit 150. When the disc lifter position detector 153 detects that the disc lifter 82 is raised, the motor control circuit 150 supplies a signal to the timer 152 to start a timer operation. The motor control circuit 150 produces a reset signal when supplied with a manipulation detection signal upon manipulation of the load-eject button 80 or the play button 137. The timer 152 produces a motor driving signal after a predetermined time period has elapsed from the time when the timer 152 is operated. When this motor driving signal is produced from the timer 152, the motor driving circuit 151 is operated by a control signal from the motor control circuit 150. Thus, the motor 84 is rotated in the reverse direction, to lower the disc lifter 82. The above predetermined time period set in the timer 152, is a time period from which it may be assumed that the reproducing apparatus 50 left neglected in the midst of a manipulation, that is, three minutes, for example. The above set time period is longer than the time required for the operator to search and obtain the empty jacket upon recovery of the disc, and is sufficiently shorter than the time when the above described deformation may be introduced in the disc 15 due to the continuous support by the disc lifter 82.

If the load-eject button 80 is manipulated upon reproduction of the disc 15, the motor driving circuit 151 is operated by the control signal from the motor control circuit 150. By the operation of the motor driving circuit 151, the motor 84 is rotated in the forward direction, and the disc lifter elevator mechanism 81 operates to raise the disc lifter 82. The timer 152 starts the timer operation when the disc lifter 82 is raised. Normally, before the above set time period in the timer 152 elapses, the disc 15 is loaded and the play button 137 is manipulated. When the play button 137 is manipulated, the motor control circuit 150 supplies the reset signal to the timer 152 and supplies the control signal to the motor driving circuit 151. Accordingly, the timer 152 is reset, and the motor 84 is driven to rotate in the reverse direction so as to lower the disc lifter 82.

There may be a case where the load-eject button 80 is manipulated and the disc 15 is supported on the raised disc lifter 82, but the anticipated manipulation of the play button 137 is not carried out. In such a case where the reproducing apparatus is left neglected, the motor driving signal is reproduced from the timer 152 after the above predetermined time period elapses. Thus, the rotational direction of the motor 84 is automatically reversed, to lower the disc lifter 82. Hence, the disc 15 is placed onto the turntable 52, and is prevented from being deformed.

In addition, if the load-eject button 80 is manipulated upon reproduction of the disc 15 and upon reproduction of the lead-out signal, the motor driving circuit 151 is operated by the control signal from the motor control circuit 150, and the motor 84 rotates in the forward direction. The above lead-out signal is applied to the motor control circuit 150 through an input terminal 155. When the motor 84 rotates in the forward direction, the disc lifter supports the disc 15 and rises. The timer 152 starts the timer operation as the disc lifter 82 rises. Normally thereafter, the disc recovering operation is carried out before the above set time period in the timer 152 elapses. There may however be a case where the set time period is exceeded without the disc recovering operation being carried out after the disc lifter 82 is raised. In such a case, the motor driving signal is produced from the timer 152, to automatically rotate the motor 84 in the reverse direction and lower the disc filter 82. Accordingly, after the reproduction is terminated, the reproducing apparatus will not be left neglected in the state where the disc lifter 82 supports the disc 15, and the disc is thus prevented from being deformed.

Figure 7:
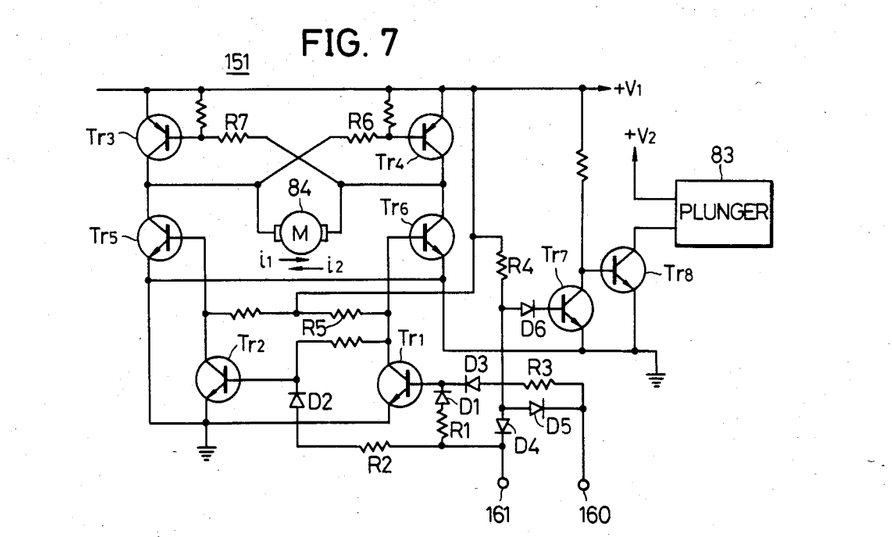
FIG. 7 is a circuit diagram showing a motor driving circuit in the block system shown in FIG. 6.

Next, description will be given with respect to the operation of the motor driving circuit 151, by referring to FIG. 7. In FIG. 7, signals from the motor control circuit 150 are supplied to input terminals 160 and 161. The motor control circuit 150 is constructed to supply a signal in accordance with the detection state of the disc lifter position of the disc lifter position detector 153, to the above input terminal 160. This signal supplied to the input terminal 160 is a low-level signal when the disc lifter 82 is in the raised position, and is a high-level signal when the disc lifter 82 is in the lowered position. Further, the motor control circuit 150 is also constructed to supply a signal related to the manipulation system and the timer 152, to the above other input terminal 161. This signal supplied to the input terminal 161 is a high-level signal before the predetermined time period set in the timer 152 is elapsed, and is a low-level signal after the set predetermined time period is elapsed. The motor control circuit 150 also supplies a low-level signal to the input terminal 161 when the buttons 80 and 137 are manipulated and when the lead-out signal is supplied thereto.

For example, if the reproduction of the disc is terminated and the disc lifter 82 is at the raised position, a low-level signal is applied to the input terminal 160. Here, before the above predetermined time period set in the timer 152 is elapsed, a high-level signal is applied to the input terminal 161. The incoming high-level signal to the input terminal 161 is applied to the base of an NPN type transistor Tr1, through a resistor R1 and a diode D1. Thus, the transistor Tr1 is turned ON. In addition, the above high-level signal applied to the input terminal 161 is simultaneously applied to the base of an NPN type transistor Tr2, through a resistor R2 and a diode D2. Hence, the transistor Tr2 is turned ON.

Collectors of a PNP type transistor Tr3 and an NPN type transistor Tr5 are respectively connected to one terminal of the motor 84, and are also connected to the base of a PNP type transistor Tr4 through a resistor R6. On the other hand, the collectors of the transistors Tr4 and Tr6 are respectively connected to the other terminal of the motor 84, and also connected to the base of the transistor Tr3 through a resistor R7. Accordingly, among the transistors Tr3, Tr4, Tr5, and Tr6 constituting a bridge circuit, the transistors Tr5 and Tr6 are turned OFF when the transistors Tr1 and Tr2 are turned ON. Therefore, regardless of the level of the signal applied to the input terminal 160, a current does not flow to the motor 84, and the motor 84 does not rotate.

After the above predetermined time period set in the timer 152 lapses, a low-level signal is applied to the input terminal 161. On the other hand, a low-level signal is applied to the input terminal 160. This low-level signal applied to the input terminal 160 is applied to the base of the transistor Tr1, through a resistor R3 and a diode D3. Moreover, a diode D4 is simultaneously turned ON due to the low signal level at the input terminal 161. Hence, a positive power source voltage is applied to the base of the transistor Tr2, through a resistor R4, diode D4, resistor R2, and diode D2. Accordingly, the transistor Tr1 is turned OFF.

When the transistor Tr2 is turned ON, the base of the transistor Tr5 substantially becomes of ground level. On the other hand, the positive power source voltage is supplied to the base of the transistor Tr6 through a resistor R5. Thus, the transistor Tr5 is turned OFF, and the transistor Tr6 is turned ON. Moreover, when the transistor Tr5 is turned OFF, the collector potential of the transistor Tr5 and the base potential of the transistor Tr4 respectively rise, and the transistor Tr4 is turned OFF. On the other hand, the collector potential of the transistor Tr6 and the base potential of the transistor Tr3 decreases to a level below the power source voltage due to the ON state of the transistor Tr6, the transistor Tr3 is accordingly turned ON. As a result, the current obtained from the collector of the transistor Tr3 flows through the motor 84 and the transistor Tr6 as indicated by i1 in FIG. 7. The motor 84 thus rotates in the reverse direction to lower the disc lifter 82.

If a low-level signal is applied to the input terminal 161, the signal supplied to the base of an NPN type transistor Tr7 through a diode D6 becomes of low level. The transistor Tr7 is thus turned OFF, and an NPN type transistor Tr8 is turned ON. As a result, the plunger 83 is energized. That is, the plunger 83 is energized when the motor 84 rotates.

The motor driving circuit 151 is constructed so that the motor driving circuit 151 can also be used upon recovering of the disc and the like. That is, in a state where the disc lifter 82 is at the lowered position and the signal applied to the input terminal 160 is of high level and the load-eject button 80 is manipulated in order to load or recover the disc, the input signal level at the input terminal 161 becomes of low level. Accordingly, the transistors Tr1, Tr4, and Tr5 respectively are turned ON, while the transistors Tr2, Tr3, and Tr6 respectively are turned OFF. A current thus flows in a reverse direction to the motor 84 as indicated by i2 in FIG. 7. Hence, the motor 84 rotates in the forward direction to raise the disc lifter 82.

The disc 15 lowered together with the disc lifter 82 and placed onto the turntable 52, because the disc is left neglected and not recovered after termination of the reproduction, may be recovered within the disc case 10 by manipulating the load-eject button 80 to raise the disc 15.

Other objects and further features of the present invention will be apparent from the following detailed description when read in conjunction with the accompanying drawings.

What is claimed is:

1. A rotary recording medium reproducing apparatus for reproducing a rotary recording medium accommodated within a case, said case comprising a jacket provided with a space for accommodating said rotary recording medium and an opening for allowing said rotary recording medium to go in and out of said jacket, and a lid member inserted through said opening of said jacket for closing said opening of said jacket, said rotary recording medium reproducing apparatus comprising:
   an inserting opening through which said case is inserted;
   a turntable for rotating said rotary recording medium;
   lid member locking means and rotary recording medium clamping means respectively provided at an innermost part of said reproducing apparatus opposite to said inserting opening with respect to said turntable;
   jacket opening enlarging means provided in the vicinity of said inserting opening, capable of moving over said turntable between a position in the vicinity of said inserting opening and said innermost part of said reproducing apparatus, in response to an operation in which said case is inserted into and pulled out from said reproducing apparatus;
   a rotary recording medium supporting member provided at a center part of said turntable, capable of moving upwards and downwards independently of said turntable, for rising to support an inner peripheral part of said rotary recording medium so that said rotary recording medium is supported above said turntable;
   a supporting member elevator mechanism for elevating said rotary recording medium supporting member, said supporting member elevator mechanism operating so that said rotary recording medium supporting member is in a raised state when said case or an empty jacket is inserted into said reproducing apparatus;
   driving means for operating said supporting member elevator mechanism, said driving means operating in one direction to operate said supporting member elevator mechanism so that said rotary recording medium supporting member is raised, and operating in a reverse direction to operate said supporting member elevator mechanism so that said rotary recording medium supporting member is lowered;
   detecting means for detecting that said rotary recording medium supporting member is at the raised position; and
   control means for controlling said driving means so as to operate in said reverse direction when said rotary recording medium supporting member is still at the raised position after a predetermined time period has elapsed from a time when said detecting means is operated.

2. A reproducing apparatus as claimed in claim 1 which further comprises a manipulation detection signal producing means for detecting that a manipulation button of said reproducing apparatus is manipulated and producing a manipulation detection signal, and said control means comprises a timer wherein the predetermined time period is set, said timer being operated by a signal from said detecting means, producing a signal after the above predetermined time period has elapsed, and being reset when supplied with said manipulation detection signal from said manipulation detection signal producing means, and a driving circuit responsive to the signal from said timer, for operating said driving means in a reverse direction.

3. A reproducing apparatus as claimed in claim 2 in which said predetermined time period set in said timer is selected to a time period of three minutes, for example, sufficiently short so that deformation is not introduced in said rotary recording medium due to the continuous support provided by said rotary recording medium supporting member.

4. A reproducing apparatus as claimed in claim 1 in which said driving means is a D.C. motor rotating in a forward direction to operate said supporting member elevator mechanism so that said rotary recording medium supporting member is raised, and rotating in a reverse direction to operate said supporting member elevator mechanism so that said rotary recording medium supporting member is lowered.

5. A reproducing apparatus as claimed in claim 2 in which said driving means comprises a transistor bridge circuit assembled with a D.C. motor, and a control circuit part for controlling said bridge circuit, and said driving means can also be used when rotating said D.C. motor in the forward direction.

* * * * *